United States Patent
Schroers et al.

(10) Patent No.: US 11,080,824 B2
(45) Date of Patent: Aug. 3, 2021

(54) TECHNIQUES FOR UPSCALING IMAGES GENERATED WITH UNDETERMINED DOWNSCALING KERNELS

(71) Applicant: DISNEY ENTERPRISES, INC., Burbank, CA (US)

(72) Inventors: Christopher Schroers, Glendale, CA (US); Yifan Wang, Zurich (CH); Victor Cornillere, Zurich (CH); Olga Sorkine-Hornung, Zurich (CH); Abdelaziz Djelouah, Zurich (CH)

(73) Assignees: DISNEY ENTERPRISES, INC., Burbank, CA (US); ETH ZÜRICH, Zürich (CH)

( * ) Notice: Subject to any disclaimer, the term of this patent is extended or adjusted under 35 U.S.C. 154(b) by 40 days.

(21) Appl. No.: 16/542,227

(22) Filed: Aug. 15, 2019

(65) Prior Publication Data
US 2021/0049739 A1 Feb. 18, 2021

(51) Int. Cl.
*G06T 3/00* (2006.01)
*G06T 3/40* (2006.01)

(52) U.S. Cl.
CPC .. *G06T 3/4046* (2013.01); *G06T 2207/20081* (2013.01); *G06T 2207/20084* (2013.01)

(58) Field of Classification Search
CPC ......... G06T 3/4046; G06T 2207/20084; G06T 2207/20081
See application file for complete search history.

(56) References Cited

U.S. PATENT DOCUMENTS

| 2019/0378242 A1* | 12/2019 | Zhang | G06T 3/4061 |
| 2020/0265567 A1* | 8/2020 | Hu | G06T 5/003 |
| 2020/0302576 A1* | 9/2020 | Xu | G06T 3/40 |

(Continued)

OTHER PUBLICATIONS

Gu et al., "Blind Super-Resolution With Iterative Kernel Correction", IEEE/CVF Conference on Computer Vision and Pattern Recognition, 2019, 10 pages (Year: 2019).*

(Continued)

*Primary Examiner* — Ping Y Hsieh
(74) *Attorney, Agent, or Firm* — Artegis Law Group, LLP

(57) ABSTRACT

A scaling application estimates a downscaling kernel used to generate a downscaled image. The scaling application upscales the downscaled image based on the estimated downscaling kernel, thereby generating a higher resolution version of the downscaled image with minimal visual artifacts. The scaling application includes various networks that perform the above operations. A kernel mapping network generates a degradation map based on the estimated downscaling kernel. A degradation-aware generator network generates a reconstructed image based on the downscaled image and the degradation map. A kernel discriminator network generates an image delta that reflects visual artifacts present in the reconstructed image. The scaling application includes a parameter optimizer that iteratively modifies the estimated downscaling kernel to reduce visual artifacts indicated in the image delta. Via one or more iterations, the scaling application generates a reasonably accurate estimation of the downscaling kernel and can then upscale the downscaled image with reduced visual artifacts.

20 Claims, 5 Drawing Sheets

(56) References Cited

U.S. PATENT DOCUMENTS

2020/0327360 A1* 10/2020 Samala ................ G06K 9/6263

OTHER PUBLICATIONS

Arbeláez et al., "Contour Detection and Hierarchical Image Segmentation", IEEE transactions on Pattern Analysis and Machine Intelligence, vol. 33, No. 5, May 2011, pp. 898-916.
Bégin et al., "Blind Super-Resolution using a Learning-Based Approach", IEEE Computer Society, Proceedings of the 17th International Conference on Pattern Recognition, vol. 2, 2004, 5 pages.
Bégin et al., "PSF Recovery from Examples for Blind Super-Resolution", IEEE International Conference on Image Processing, vol. 5, 2007, 4 pages.
Bigdeli et al., "Deep Mean-Shift Priors for Image Restoration", 31st Conference on Neural Information Processing Systems, 2017, pp. 1-10.
Caballero et al., "Real-Time Video Super-Resolution with Spatio-Temporal Networks and Motion Compensation", IEEE Conference on Computer Vision and Pattern Recognition, 2017, 10 pages.
Dong et al., "Learning a Deep Convolutional Network for Image Super-Resolution", European Conference on Computer Vision, LNCS, vol. 8692, Springer, 2014, pp. 184-199.
Dong et al., "Accelerating the Super-Resolution Convolutional Neural Network", European Conference on Computer Vision, Part II, LNCS, vol. 9906, Springer, 2016, pp. 391-407.
Efrat et al., "Accurate Blur Models vs. Image Priors in Single Image Super-Resolution", 14th IEEE International Conference on Computer Vision, 2013, pp. 1-8.
Gu et al., "Blind Super-Resolution With Iterative Kernel Correction", IEEE/CVF Conference on Computer Vision and Pattern Recognition, 2019, 10 pages.
Joshi et al., "PSF Estimation using Sharp Edge Prediction", Proceedings/CVPR, IEEE Computer Society Conference on Computer Vision and Pattern Recognition, 2008, 8 pages.
He et al., "A soft MAP Framework for blind super-resolution image reconstruction", Science Direct, Image and Vision Computing, vol. 27, 2009, pp. 364-373.
Glasner et al., "Super-Resolution from a Single Image", Proceedings / IEEE International Conference on Computer Vision. IEEE International Conference on Computer Vision, 2009, 8 pages.
Kim et al., "Accurate Image Super-Resolution using very Deep Convolutional Networks", Proceedings of the IEEE Conference on Computer Vision and Pattern Recognition, 2016, pp. 1646-1654.
Kingma et al., "Adam: A Method for Stochastic Optimization", ICLR, 2015, pp. 1-15.
Ledig et al., "Photo-Realistic Single Image Super-Resolution using a Generative Adversarial Network", Proceedings of the IEEE Conference on Computer Vision and Pattern Recognition, 2017, pp. 105-114.
Lim et al., "Enhanced Deep Residual Networks for Single Image Super-Resolution", Proceedings of the IEEE Conference on Computer Vision and Pattern Recognition Workshops, 2017, pp. 1132-1140.
Michael et al., "Nonparametric Blind Super-Resolution", Proceedings of the 2013 IEEE International Conference on Computer Vision, 2013, pp. 1-8.
Nasrollahi et al., "Super-resolution: a comprehensive survey", Machine Vision and Applications, Springer, Jun. 14, 2014, 46 pages.
Qiao et al., "A Novel SVM-Based Blind Super-Resolution Algorithm", IEEE International Joint Conference on Neural Network Proceedings, Jul. 16-21, 2006, pp. 2523-2528.
Chang et al., "One Network to Solve Them All-Solving Linear Inverse Problems using Deep Projection Models", IEEE International Conference on Computer Vision (ICCV), 2017, pp. 1-12.
Sajjadi et al., "Frame-Recurrent Video Super-Resolution", IEEE/CVF Conference on Computer Vision and Pattern Recognition, 2018, 9 pages.
Shi et al., "Real-Time Single Image and Video Super-Resolution using an Efficient Sub-Pixel Convolutional Neural Network", Proceedings of the IEEE Conference on Computer Vision and Pattern Recognition, 2016, pp. 1874-1883.
Shocher et al., ""Zero-Shot" Super-Resolution using Deep Internal Learning", IEEE/CVF Conference on Computer Vision and Pattern Recognition (CVPR), 2018, pp. 3118-3126.
Tomofte et al., "Ntire 2017 Challenge on Single Image Super-Resolution: Methods and Results", Proceedings of the IEEE Conference on Computer Vision and Pattern Recognition Workshops, 2017, pp. 114-125.
Wang et al., "A Fully Progressive Approach to Single-Image Super-Resolution", 2018, 10 pages.
Yang et al., "Single-Image super-resolution: A Benchmark", European Conference on Computer Vision, Part IV, LNCS, Springer, 2014, pp. 372-386.
Zeyde et al., "On Single Image Scale-Up using Sparse-Representations", International conference on Curves and Surfaces, LNCS, vol. 6920, Springer, Jun. 2010, pp. 711-730.
Zhang et al., "Learning Deep CNN Denoiser Prior for Image Restoration", Proceedings of the IEEE Conference on Computer Vision and Pattern Recognition, 2017, pp. 3929-3938.
Zhang et al., Learning a Single Convolutional Super-Resolution Network for Multiple Degradations, Proceedings/CVPR, IEEE Computer Society Conference on Computer Vision and Pattern Recognition, 2018, 10 pages.
Zhang et al., "Deep Plug-and-Play Super-Resolution for Arbitrary Blur Kernels", 2019, pp. 1-11.
Zhang et al., "The Unreasonable Effectiveness of Deep Features as a Perceptual Metric", 2018, pp. 586-595.
Zhang et al., "Gated Fusion Network for Joint Image Deblurring and Super-Resolution", BMVC, 2018, pp. 1-13.
Extended European Search Report for application No. 20189699.0 dated Nov. 11, 2020.
Cornillere et al., "Blind Image Super-Resolution with Spatially Variant Degradations", XP055743465, ISSN: 0730-0301, DOI: 10.1145/3355089.3356575, ACM Transactions on Graphics, vol. 38, No. 6, Article 166, Nov. 8, 2019, pp. 166:1-166:13.

* cited by examiner

TECHNIQUES FOR UPSCALING IMAGES GENERATED WITH UNDETERMINED DOWNSCALING KERNELS

BACKGROUND

Field of the Various Embodiments

Various embodiments relate generally to video processing and, more specifically, to techniques for upscaling images generated with undetermined downscaling kernels.

Description of the Related Art

A typical media production pipeline includes one or more media processing stages where the resolution of the media content being processed is increased and/or decreased for various reasons. For example, the media content being processed could have been captured initially at a relatively higher resolution, such as an 8K resolution. This higher-resolution version of the media content could then be downscaled, using a known downscaling kernel, to a relatively lower resolution, such as an HD (high-definition) resolution, that is more suitable for downstream production processing operations. In the downstream portion of the media production pipeline, this lower-resolution version of the media content could be composited with additional rendered content to generate a lower-resolution composite version of the media content. Subsequently, the lower-resolution composite version of the media content could be upscaled, using the known downscaling kernel, to a relatively higher resolution that is more suitable for viewing, such as a 4K resolution.

One drawback of the above approach is that media content usually can be downscaled to a relatively lower resolution and then upscaled to a relatively high resolution without introducing visual artifacts only if the downscaling kernel used for the downscaling and upscaling operations is known. However, in many situations the downscaling kernel is unknown and therefore cannot be used to upscale the lower-resolution version of the media content without introducing substantial visual artifacts into the resulting upscaled version of the media content. Visual artifacts are undesirable because visual artifacts can degrade the overall visual quality of the media content, leading to poor viewing experiences.

As the foregoing illustrates, what is needed in the art is a more effective approach to upscaling media content when the downscaling kernel is unknown.

SUMMARY

Various embodiments include a computer-implemented method for scaling images, including generating a first reconstructed image based on a scaled image and a scaling kernel, wherein the first reconstructed image has a first resolution, and the scaled image has a second resolution, generating an image difference based on the scaled image and the scaling kernel, wherein the image difference indicates that at least one visual artifact resides within the first reconstructed image, modifying the scaling kernel to produce a modified scaling kernel, generating a second reconstructed image based on the scaled image and the modified scaling kernel, wherein the at least one visual artifact has been reduced within the second reconstructed image or eliminated.

At least one technological advantage of the disclosed techniques relative to the prior art is that low-resolution images downscaled using an unknown downscaling kernel can be upscaled to higher resolutions without introducing significant visual artifacts. Accordingly, the disclosed techniques can be applied in media production pipelines and other media processing contexts where media content needs to be downscaled for various reasons and then subsequently upscaled to some relatively higher resolution that is more suitable for display.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
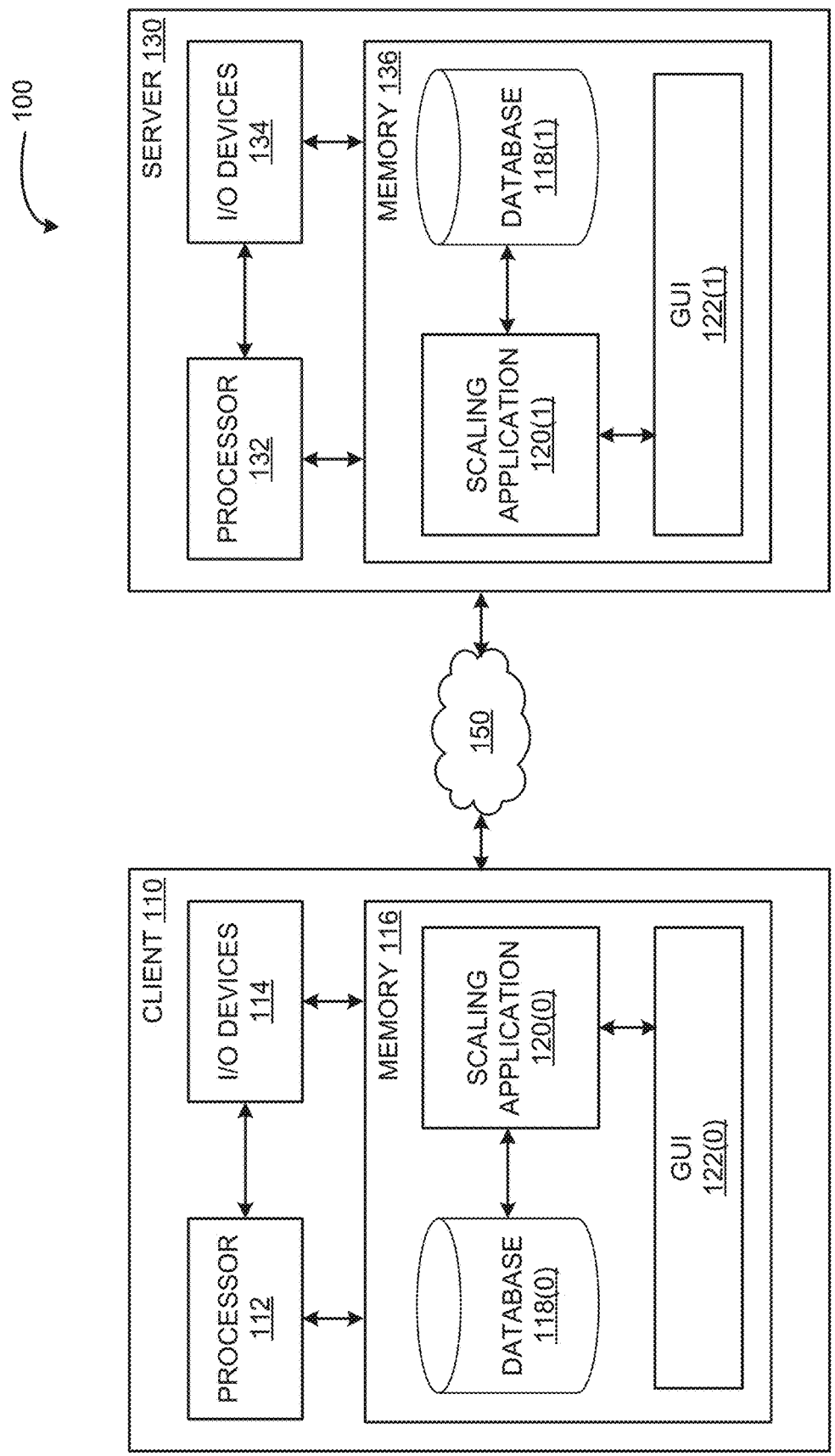
FIG. 1 illustrates a system configured to implement one or more aspects of the present embodiments.

In the following description, numerous specific details are set forth to provide a more thorough understanding of the various embodiments. However, it will be apparent to one of skilled in the art that the inventive concepts may be practiced without one or more of these specific details.

As mentioned above, a typical media production pipeline includes one or more media processing stages where the resolution of media content is increased and/or decreased for various reasons. For example, the media content could initially be captured at a higher resolution, such as an 8k resolution. The higher resolution version of the media content could then be downscaled, based on a known downscaling kernel, to a lower resolution that is suitable for production processing operations, such as an HD resolution. The lower resolution version of the media content could be composited with rendered content to generate a lower resolution composite version of the media content. Subsequently, the lower resolution composite version of the media content could be upscaled, based on the known downscaling kernel, to a higher resolution that is suitable for viewing, such as a 4k resolution.

In situations where the media content is downscaled to a lower resolution using a known downscaling kernel, as in the above example, the lower resolution version of the media content can be effectively upscaled to a higher resolution, based on the known downscaling kernel, without introducing significant visual artifacts. However, in many situations the downscaling kernel is unknown and therefore cannot be used to upscale the lower resolution version of the media content. Consequently, the lower resolution version of the media content usually cannot be upscaled to a higher resolution without introducing significant visual artifacts. These visual artifacts degrade the overall appearance of the media content and can lead to a poor viewer experience.

To address these issues, various embodiments include a scaling application that estimates a downscaling kernel used to generate a downscaled image. The scaling application then upscales the downscaled image based on the estimated downscaling kernel, thereby generating a higher resolution version of the downscaled image with minimal visual artifacts. The scaling application includes various networks that perform the above operations. In particular, a kernel mapping network generates a degradation map based on the estimated downscaling kernel. A degradation-aware generator network generates a reconstructed image based on the downscaled image and the degradation map. A kernel discriminator network generates an image delta that reflects visual artifacts present in the reconstructed image. The scaling application further includes a parameter optimizer that iteratively modifies the estimated downscaling kernel in order to reduce visual artifacts indicated in the image delta. Via one or more iterations, the scaling application generates an increasingly accurate estimation of the downscaling kernel that can be used to upscale the downscaled image with reduced visual artifacts.

At least one technological advantage of the disclosed techniques relative to the prior art is that low-resolution images downscaled using an unknown downscaling kernel can be upscaled to higher resolutions without introducing significant visual artifacts. Accordingly, the disclosed techniques can be applied to media production pipelines where media content needs to be downscaled for various reasons and then subsequently upscaled to some relatively higher resolution that is more suitable for display. These technological advantages represent one or more technological advancements over prior art approaches.

System Overview

FIG. 1 illustrates a system configured to implement one or more aspects of the various embodiments. As shown, a system 100 includes a client 110 and a server 130 coupled together via a network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a database 118(0), a scaling application 120(0), and a graphical user interface (GUI) 122(0). Database 118(0) stores various data that is processed by scaling application 120(0). Scaling application 120(0) is a software application that, when executed by processor 112, interoperates with a corresponding software application executing on server 130. GUI 122(0) is an interface through which scaling application 120(0) can receive input and provide output.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes a database 118(1), a scaling application 120(1), and a GUI 122(1). Database 118(1) stores various data that is processed by scaling application 120(1). Scaling application 120(1) is a software application that, when executed by processor 112, interoperates with scaling application 120(1) executing on client 110. GUI 122(1) is an interface through which scaling application 120(1) can receive input and provide output.

As a general matter, databases 118(0) and 118(1) represent separate portions of a distributed storage entity. Thus, for simplicity, databases 118(0) and 118(1) are collectively referred to hereinafter as database 118. Similarly, scaling application 120(0) and scaling application 120(1) represent separate portions of a distributed software entity that is configured to perform any and all of the inventive operations described herein. Thus, for simplicity, scaling applications 120(0) and 120(1) are collectively referred to hereinafter as scaling application 120. GUIs 122(0) and 122(1) likewise represent separate portions of a distributed GUI that is referred to collectively hereinafter as GUI 122.

In operation, scaling application 120 is configured to process downscaled images in order to generate higher resolution versions of those images. In so doing, scaling application 120 estimates a downscaling kernel used to generate the downscaled images and then modifies the estimated downscaling kernel (or an encoded and/or compressed version thereof) to reduce visual artifacts in the higher resolution versions of those images, as described in greater detail below in conjunction with FIGS. 2A-4.

Software Overview

Figure 2A:
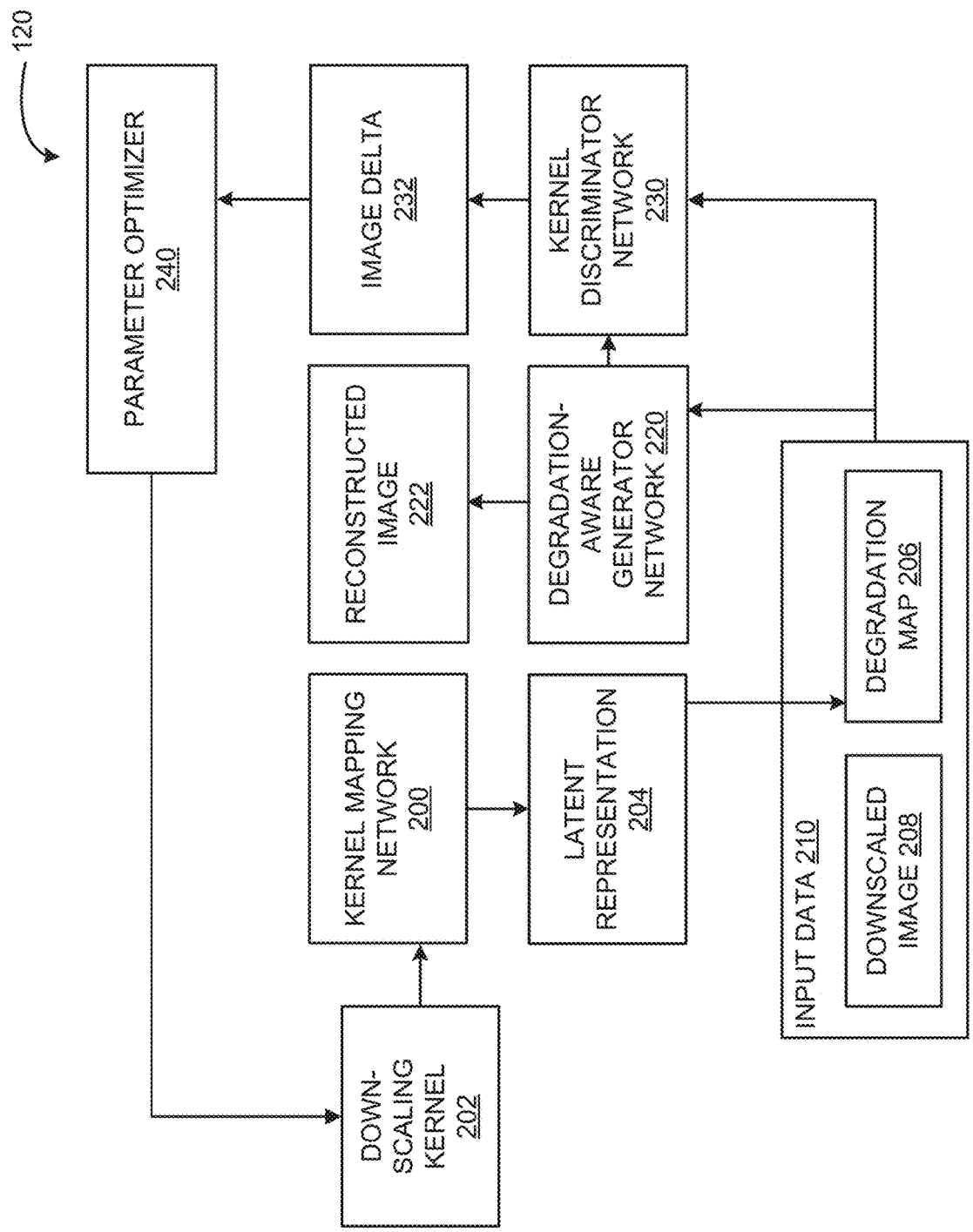
FIG. 2A is a more detailed illustration of the scaling application of FIG. 1, according to various embodiments.

FIG. 2A is a more detailed illustration of the scaling application of FIG. 1, according to various embodiments. As shown, scaling application 120 includes a kernel mapping network 200, a degradation-aware generator network 210, a kernel discriminator network 220, input data 210, and a parameter optimizer 240. Kernel mapping network 200, degradation-aware generator network 210, and kernel discriminator network 220 are artificial neural networks that are trained via an approach described below in conjunction with FIG. 2B. In one embodiment, one or more of the above networks may be convolutional neural networks.

In operation, kernel mapping network 200 obtains or generates a downscaling kernel 202. In some usage scenarios, downscaling kernel 202 is pre-determined and therefore known to have been used to generate downscaled image 208. However, in other usage scenarios, the downscaling kernel used to generate downscaled image 208 is not predetermined and therefore unknown. In these usage scenarios, downscaling kernel 202 is randomized or randomly sampled from a kernel space that spans a set of possible downscaling kernels to provide an approximation to the downscaling kernel that may have been used to generate downscaled image 208. An exemplary kernel space is described in greater detail below in conjunction with FIG. 3.

Kernel mapping network 200 encodes downscaling kernel 202 into a latent space to generate latent representation 204. Latent representation 204 is a reduced-dimensionality version of downscaling kernel 204. In one embodiment, kernel mapping network 200 may be a two-layer dense network that analyzes a vector form of downscaling kernel 202 that is obtained via row concatenation. Kernel mapping network 200 may then map the vector form of downscaling kernel 202 to latent representation 204.

Kernel mapping network 200 assembles one or more instances of latent representation 204 to form a degradation map 206. Degradation map 206 is a spatial feature map that indicates various spatially-dependent sources of degradation. Kernel mapping network 200 generates degradation map 204 via one of the following processes. In situations where downscaled image 208 is generated based on a single downscaling kernel that does not vary across regions or pixel locations of a given input image, kernel mapping network 200 assembles degradation map 206 by copying latent representation 204 across those regions or pixel locations. In situations where downscaled image 208 is generated based on multiple downscaling kernels that vary across regions or pixel locations of the given input image, kernel mapping network 200 assembles degradation map 206 by generating a different latent representation 204 for each different region or pixel location and combining those different latent representations 204 into degradation map 206.

Via degradation map 206 described above, kernel mapping network 200 can address downscaling operations that are performed via spatially invariant downscaling kernels as well as those performed via spatially variant downscaling kernels. In one embodiment, kernel mapping network 200 may initially treat downscaling kernel 202 as spatially invariant and therefore include copies of latent representation 204 within degradation map 206. Kernel mapping network 200 may subsequently treat downscaling network 202 as having one or more spatial variations and then modify degradation map 206 to include different versions of latent representation 204 within degradation map 206. The spatial variations in downscaling kernel 202 may be encoded into degradation map 206 via a parameter optimization process that is described below in conjunction with FIG. 2B.

Downscaled image 208 and degradation map 206 are included in input 210 and supplied to degradation-aware generator network 220 and kernel discriminator network 230. Degradation-aware generator network 220 is a convolutional neural network that analyzes downscaled image 208 and degradation map 206 to generate a reconstructed image 222. Reconstructed image 222 is a higher resolution version of downscaled image 206. Degradation-aware generator network 220 is trained to generate higher resolution versions of downscaled images via an approach that is described in greater detail below in conjunction with FIG. 2B.

Kernel discriminator network 230 is a convolutional neural network that analyzes downscaled image 208, degradation map 206, and one or more outputs of degradation-aware generator network 230 to generate an image delta 232. Image delta 232 generally indicates any artifacts that may be present in reconstructed image 222. Such artifacts can be present when the downscaling kernel is unknown and degradation-aware generator network 220 therefore receives as input a degradation map 206 that is generated based on a randomized or randomly sampled downscaling kernel 202. Under nominal circumstances, image delta 232 represents the difference between downscaled image 208 and an original, higher-resolution version of downscaled image 208, as predicted by kernel discriminator network 230. In one embodiment, kernel discriminator network 230 may receive one or more outputs from at least one feature layer included in degradation aware generator network 220. Degradation-aware generator network 220 is trained to generate image deltas via an approach that is described in greater detail below in conjunction with FIG. 2B.

Parameter optimizer 240 obtains image delta 232 from kernel generator network 232 and then performs a parameter optimization process with at least one of downscaling kernel 202 and degradation map 206. When performing the parameter optimization process with downscaling kernel 202, parameter optimizer 240 modifies one or more coefficients that describe the physical configuration of downscaling kernel 202 to minimize image delta 232 following a subsequent processing iteration of kernel mapping network 200, degradation-aware generator network 220, and kernel discriminator network 230. In particular, kernel discriminator network 230 optimizes the one or more coefficients of downscaling kernel 202 to cause image delta 232 to approach zero, indicating that some or all artifacts included in reconstructed image 222 have been eliminated. The described approach can be implemented when downscaling kernel 202 is spatially invariant.

When performing the parameter optimization process with degradation map 206, parameter optimizer 240 modifies one or more versions of latent representation 204 included in degradation map 206 to minimize image delta 232 following a subsequent processing iteration of kernel mapping network 200, degradation-aware generator network 220, and kernel discriminator network 230. Specifically, kernel discriminator network 230 performs one or more spatially-varying modifications to degradation map 206 to cause image delta 232 to approach zero, indicating that some or all artifacts included in reconstructed image 222 have been eliminated. The described approach can be implemented when downscaling kernel 202 is spatially invariant and also when downscaling kernel 202 varies across different regions or pixel locations in a given input image.

Via the above techniques, reconstructed image 222 can be generated that has a higher resolution than downscaled image 208 but has few, if any, visual artifacts. Further, the disclosed approach can be implemented when downscaling kernel 202 is pre-determined and therefore known to have been used to generate downscaled image 208 and also when the downscaling kernel used to generated downscaled image 208 is unknown and/or spatially variant. The various networks described above can be trained using the techniques described below in conjunction with FIG. 2B.

Network Training

Figure 2B:
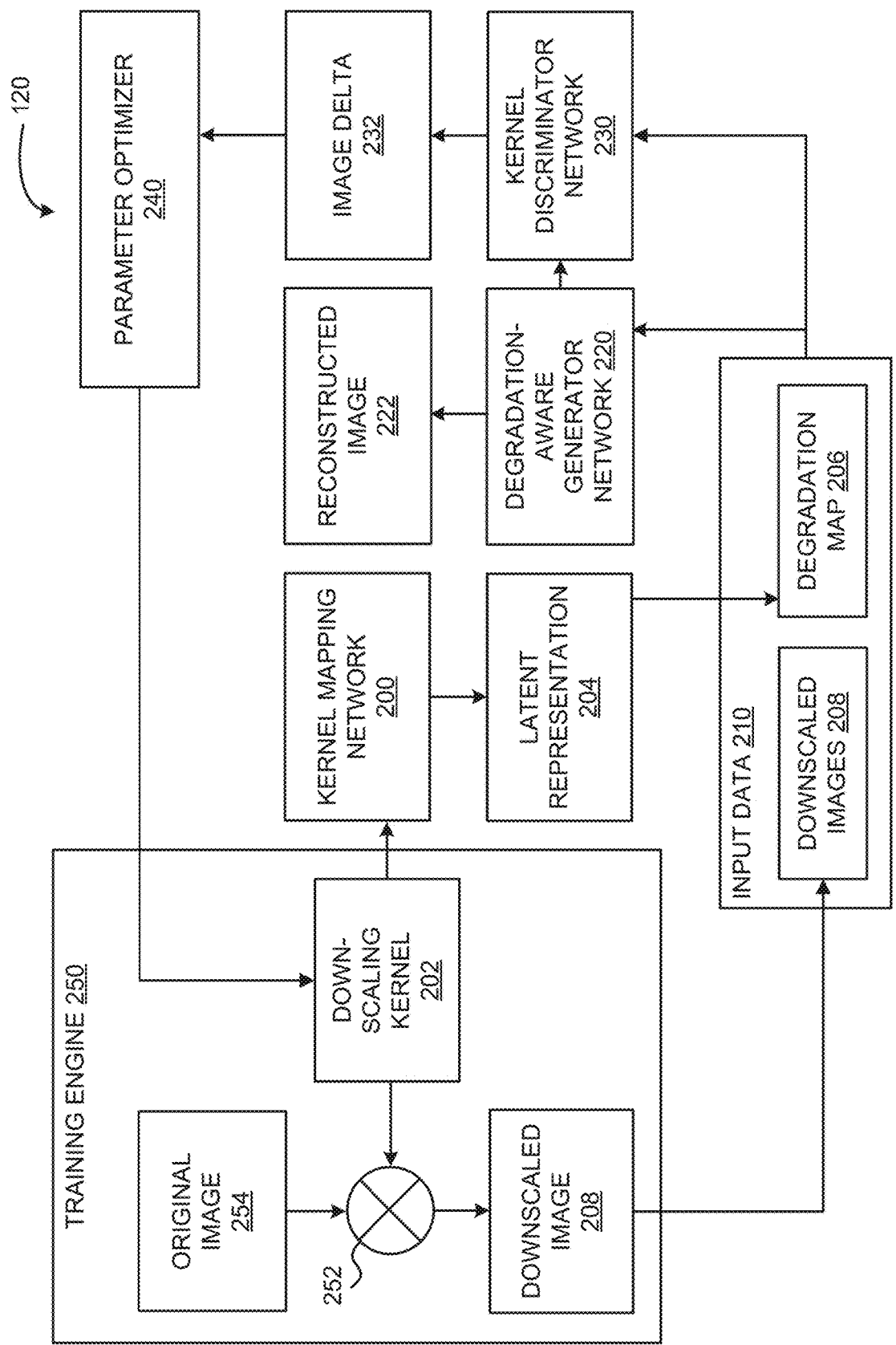
FIG. 2B illustrates a training engine that can be included in the scaling application of FIG. 2A, according to other various embodiments.

FIG. 2B illustrates a training engine that can be included in the scaling application of FIG. 2A, according to various other embodiments. As shown, a training engine 250 includes a convolutional operator 252 that is configured to perform a downscaling operation with one or more original images 254 based on one or more downscaling kernels 202 to generate one or more downscaled images 208. Original image(s) 254 can include, for example, one or more random images that generally span a variety of different image types. Training engine 250 is configured to use original image(s) 254, downscaling kernel(s) 202, and downscaled image(s) 208 as training data during two training phases described below.

In a first training phase, training engine 250 performs a backpropagation operation with various sets of weights included in kernel mapping network 200 and/or degradation-aware generator network 220 with inputs that are derived from downscaling kernel(s) 202 and downscaled image(s) 208 and target outputs that are derived from original image(s) 254. In so doing, training engine 250 modifies the sets of weights included in kernel mapping network 200 and/or degradation-aware generator network 220 until one or more reconstructed image(s) 222 match corresponding original image(s) 254 with less than a threshold error. Training engine 250 then ceases training of kernel mapping network 200 and/or degradation-aware generator network 220 to perform a second training phase.

In the second training phase, training engine 250 performs a backpropagation operation with various sets of weights included in kernel discriminator network 230 using inputs that include pairs of reconstructed images 222 generated using correct and incorrect versions of a given downscaling kernel 202. The inputs provided to kernel discriminator network 230 during the second training phase can also include at least one output of one or more convolutional layers of degradation-aware generator network 220. Training engine 250 modifies the sets of weights included in discriminator network 230 in order to encode a mapping between variations of downscaling kernels 202 and visual artifacts that occur in image deltas 232 based on those variations. With this approach, kernel discriminator network 230 is trained to predict image deltas 232 to indicate these visual artifacts.

When the above two training phases are complete, parameter optimizer 240 operates in the manner previously described to optimize downscaling kernel 202 and/or degradation map 206 to minimize image delta 232, thereby approximating the downscaling kernel used to generate downscaled images 208 (or approximate a derivative degradation map).

Referring generally to FIGS. 2A-2B, under various circumstances downscaling kernel 202 can be implemented via one or more randomized kernels and/or one or more random samplings of downscaling kernels 202, as mentioned above. In the latter case, downscaling kernels can be randomly selected from a kernel space that includes a range of possible downscaling kernels, as described in greater detail below in conjunction with FIG. 3.

Exemplary Kernel Space

Figure 3:
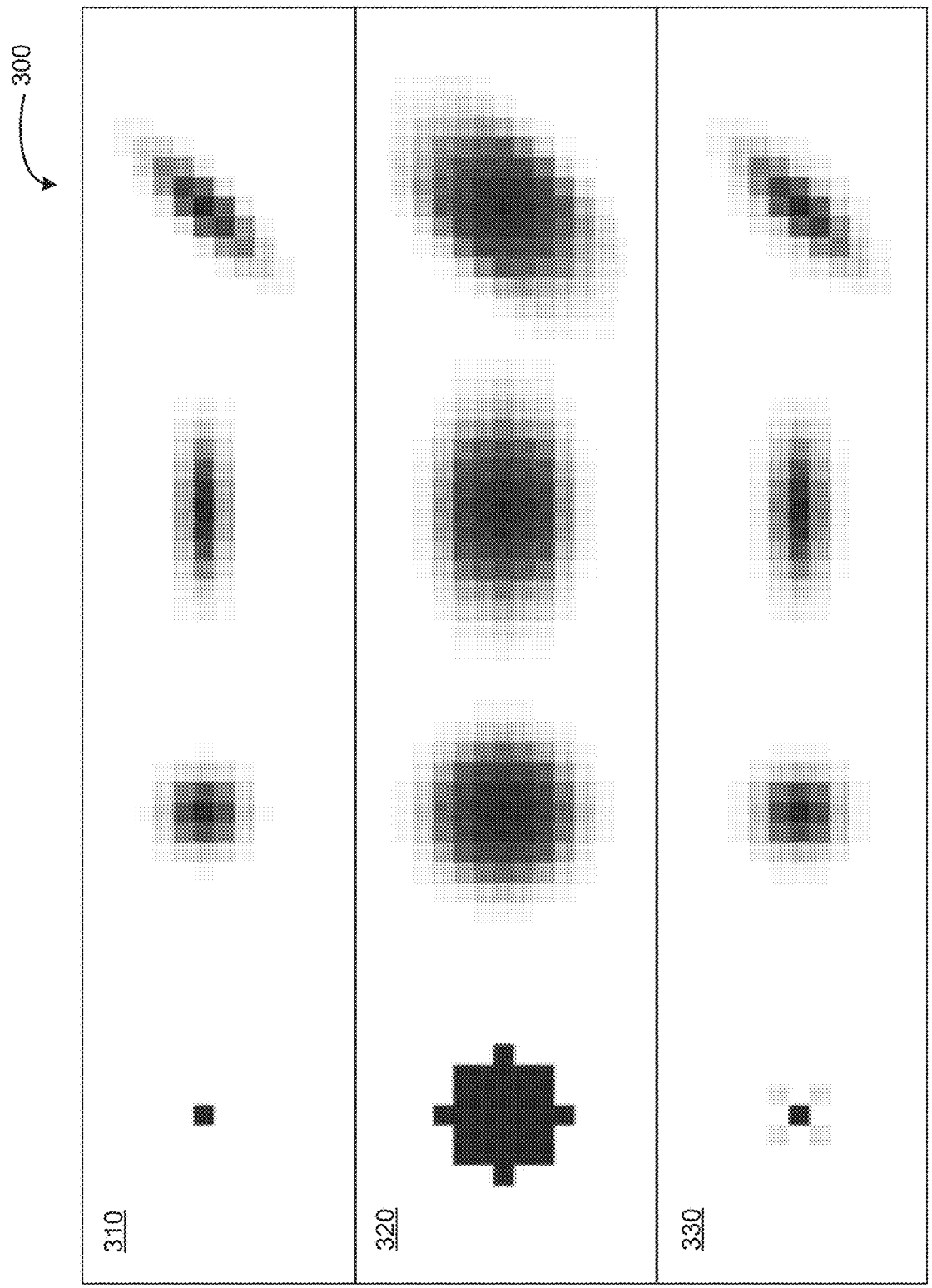
FIG. 3 illustrates a kernel space that includes a variety of different downscaling kernels, according to various embodiments.

FIG. 3 illustrates a kernel space that includes a variety of different downscaling kernels, according to various embodiments. As shown, kernel space 300 includes different types of downscaling kernels, such as impulse kernels 310, disc kernels 320, and bicubic kernels 330. Further, for any given type of kernel, kernel space 300 includes different spatial variations of the given type of kernel, including stretched and/or scaled versions of the given type of kernel.

In one embodiment, in an ordinary usage scenario, kernel mapping network 200 described above in conjunction with FIGS. 2A-2B may initially select N downscaling kernels from kernel space 300 and then compute N images deltas 232 based on these N downscaling kernels. Depending on the degree and/or severity of visual artifacts found in the resultant N image deltas 232, kernel mapping network 200 may then determine that a subset of those N downscaling kernels is more likely to include the correct downscaling kernel compared to the other downscaling kernels sampled from kernel space 300. The disclosed approach can more effectively identify the correct downscaling kernel by avoiding local minima associated with any given downscaling kernel.

In another embodiment, the disclosed techniques may be implemented in conjunction with GUI 122 of FIG. 1. GUI 122 may be configured to receive user input that reflects specific portions of downscaled images that should be upscaled with varying parameters. For example, GUI 122 could receive a brush stroke from the user emphasizing a particular region of a given downscaled image. The brush stroke could indicate that one or more parameters of downscaling kernel 202, such as the standard deviation, should be modified within that particular region.

Referring generally to FIGS. 1-3, one advantage of the disclosed techniques is that higher resolution versions of downscaled images can be generated under circumstances where the downscaling kernel used to generate those images is unavailable or unknown. Further, the disclosed techniques can be applied to situations where different portions of an image are subjected to degradations caused by different downscaling kernels. For example, when background content is superimposed with rendered content, the different types of content could have different types of visual artifacts that can be attributed to different downscaling kernels. The disclosed techniques can effectively upscale such content to produce a high-resolution version of the content with few, if any, noticeable visual artifacts. In various embodiments, the disclosed techniques may be applied to upscale lower resolution images that have not been downscaled but instead have been initially generated at a low resolution. In such situations, the downscaling kernel is generally considered to be "unavailable" since no initial downscaling operation is performed. Persons skilled in the art will understand that the disclosed techniques are applicable to any technically feasible situation where a lower resolution image needs to be upscaled to a higher resolution. The disclosed techniques are described in greater detail below in conjunction with FIG. 4.

Procedure for Upscaling Images

Figure 4:
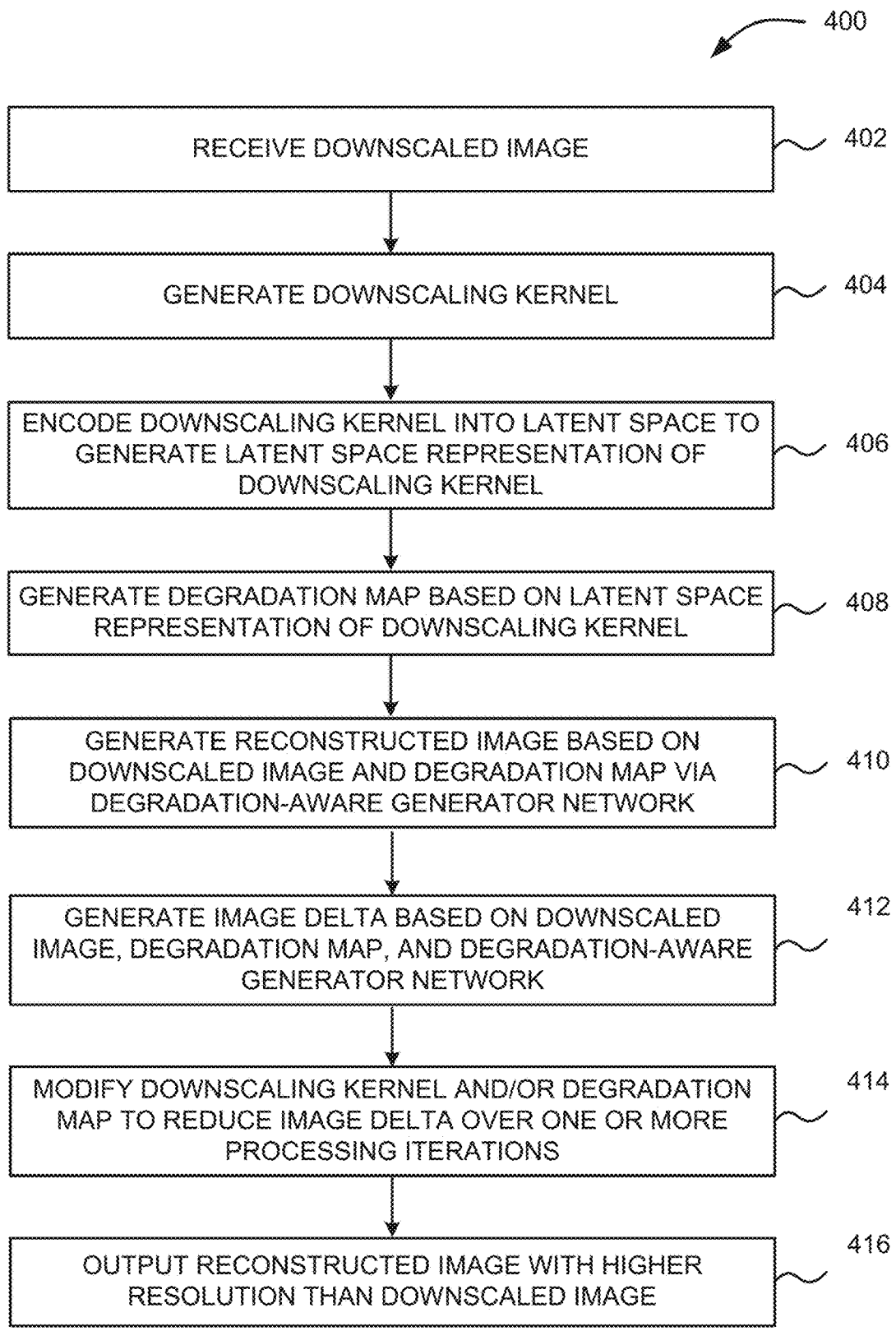
FIG. 4 is a flow diagram of method steps for upscaling an image that has been downscaled using an unknown downscaling kernel, according to various embodiments.

FIG. 4 is a flow diagram of method steps for upscaling an image that has been downscaled using an unknown downscaling kernel, according to various embodiments. Although the method steps are described in conjunction with the systems of FIGS. 1-3, persons skilled in the art will understand that any system configured to perform the method steps in any order falls within the scope of the present embodiments.

As shown, a method 400 begins at step 402, where scaling application 120 of FIG. 1 receives a downscaled image. The downscaled image can be generated in a number of different scenarios. For example, media content could be captured at a high resolution and then downscaled to a lower "working" resolution in order to perform post-production operations, such as visual effects rendering. Alternatively, the downscaled image may simply be a low resolution image that is initially captured and/or rendered at a low resolution but needs to be upscaled to a higher resolution for display.

At step 404, scaling application 120 generates a downscaling kernel. In some situations, the downscaling may be pre-determined, although typically the downscaling kernel is unknown and scaling engine 120 initially generates the downscaling kernel via a random sampling of a kernel space, such as that shown in FIG. 3. In one embodiment, scaling application 120 may initially generate multiple downscaling kernels and subsequently select one such downscaling kernel that best facilitates image upscaling.

At step 406, kernel mapping network 200 within scaling application 120 encodes the downscaling kernel generated at step 404 into a latent space to generate a latent representation of the downscaling kernel. The latent representation is a compressed version of the downscaling kernel that has a reduced dimensionality compared to the original version of the downscaling kernel.

At step 408, kernel mapping network 200 generates a degradation map based on the latent representation generated at step 406. The degradation map is a spatial feature map that indicates various spatially-dependent sources of degradation. Kernel mapping network 200 can generate the degradation map by copying the latent representation across regions or pixel locations associated with an image having a target upscaled resolution or by generating a different latent representation for each different region or pixel location and combining those different latent representations. In one embodiment, kernel mapping network 200 may be a convolutional neural network that is trained to generate the latent representation based on training data that includes one or more downscaling kernels, a set of images, and a set of downscaled images that are generated by downscaling the set of images using the one or more downscaling kernels.

At step 410, degradation-aware generator network 220 within scaling application 120 generates a reconstructed image based on the downscaled image received at step 402 and the degradation map generated at step 408. The reconstructed image has a target set of dimensions and/or resolution that, in some cases, corresponds to an original image that is downscaled to produce the downscaled image received at step 402. In one embodiment, degradation-aware generator network 420 may be a convolutional neural network that is trained to generate the latent representation based on training data that includes one or more degradation maps, a set of images, and a set of downscaled images associated with the one or more degradation maps.

At step 412, kernel discriminator network 230 generates an image delta based on the downscaled image received at step 402, the degradation map generated at step 408, and a set of outputs drawn from degradation-aware generator network 420. In one embodiment, the set of outputs may be derived from a final convolutional layer included in degradation-aware generator network 420. Kernel discriminator network 230 generates the image delta to indicate a set of artifacts that may be present within the reconstructed image generated at step 410. In one embodiment, kernel discriminator network 430 may be a convolutional neural network that is trained to generate image deltas based on training data that includes any of the inputs to and/or outputs from degradation-aware generator network 420.

At step 414, parameter optimizer 250 within scaling application 120 modifies the downscaling kernel generated at step 404 and/or the degradation map generated at step 408 to reduce the image delta over one or more processing iterations. In particular, parameter optimizer 250 iteratively modifies one or more parameters that define the downscaling kernel and/or modifies the degradation map directly and then recomputes the reconstructed image and image delta in an iterative manner until the image delta indicates less than a threshold amount of visual artifacts.

At step 416, scaling engine 120 outputs the reconstructed image with a higher resolution than the downscaled image. Because scaling engine 120 optimizes the downscaling kernel and/or the degradation map to reduce image delta, the reconstructed image output at step 416 may have minimal visual artifacts, if any.

In sum, a scaling application estimates a downscaling kernel used to generate a downscaled image. The scaling application then upscales the downscaled image based on the estimated downscaling kernel, thereby generating a higher resolution version of the downscaled image with minimal visual artifacts. The scaling application includes various networks that perform the above operations. In particular, a kernel mapping network generates a degradation map based on the estimated downscaling kernel. A degradation-aware generator network generates a reconstructed image based on the downscaled image and the degradation map. A kernel discriminator network generates an image delta that reflects visual artifacts present in the reconstructed image. The scaling application further includes a parameter optimizer that iteratively modifies the estimated downscaling kernel in order to reduce visual artifacts indicated in the image delta. Via one or more iterations, the scaling application generates a reasonably accurate estimation of the downscaling kernel and can then upscale the downscaled image with reduced visual artifacts.

At least one technological advantage of the disclosed techniques relative to the prior art is that low-resolution images downscaled using an unknown downscaling kernel can be upscaled to higher resolutions without introducing significant visual artifacts. Accordingly, the disclosed techniques can be applied to media production pipelines where media content needs to be downscaled for various reasons and then subsequently upscaled to some relatively higher resolution that is more suitable for display. These technological advantages represent one or more technological advancements over prior art approaches.

1. Some embodiments include a computer-implemented method for scaling image content, the method comprising generating a first reconstructed image based on a scaled image and a scaling kernel, wherein the first reconstructed image has a first resolution, and the scaled image has a second resolution, generating an image difference based on the scaled image and the scaling kernel, wherein the image difference indicates that at least one visual artifact resides within the first reconstructed image, modifying the scaling kernel to produce a modified scaling kernel, and generating a second reconstructed image based on the scaled image and the modified scaling kernel, wherein the at least one visual artifact has been reduced within the second reconstructed image or eliminated.

2. The computer-implemented method of clause 1, wherein generating the first reconstructed image comprises encoding the scaling kernel into a latent space to generate a latent representation of the scaling kernel, generating a degradation map based on the latent representation of the scaling kernel, and combining the scaled image and the degradation map to generate the first reconstructed image.

3. The computer-implemented method of any of clauses 1-2, wherein encoding the scaling kernel into the latent space comprises reducing a dimensionality value associated with the scaling kernel.

4. The computer-implemented method of any of clauses 1-3, wherein generating the degradation map comprises copying the latent representation of the scaling kernel across one or more regions associated with a target image having the first resolution.

5. The computer-implemented method of any of clauses 1-4, wherein combining the scaled image and the degradation map comprises classifying at least a portion of the scaled image and the degradation map using a convolutional neural network to generate the first reconstructed image.

6. The computer-implemented method of any of clauses 1-5, wherein generating the image difference comprises obtaining a set of outputs derived from a convolutional layer of a first convolutional neural network that is used to generate the first reconstructed image, and combining the scaled image and the degradation map with the set of outputs to generate the image difference, wherein the image difference represents a difference between the first reconstructed image and an initial version of the scaled image.

7. The computer-implemented method of any of clauses 1-6, wherein combining the scaled image and the degradation map with the set of outputs comprises classifying at least a portion of the scaled image and the degradation map using a second convolutional neural network to generate the image difference.

8. The computer-implemented method of any of clauses 1-7, wherein modifying the downscaling kernel comprises performing a parameter optimization operation with at least one of the downscaling kernel and an encoded version of the downscaling kernel.

9. The computer-implemented method of any of clauses 1-8, further comprising sampling a kernel space that includes a plurality of different kernels to generate the scaling kernel.

10. The computer-implemented method of any of clauses 1-9, further comprising generating the downscaled image based on the scaling kernel and an initial version of the scaled image.

11. Some embodiments include a non-transitory computer-readable medium storing program instructions that, when executed by a processor, cause the processor to scale image content by performing the steps of generating a first reconstructed image based on a scaled image and a scaling kernel, wherein the first reconstructed image has a first resolution, and the scaled image has a second resolution, generating an image difference based on the scaled image and the scaling kernel, wherein the image difference indicates that at least one visual artifact resides within the first reconstructed image, and generating a second reconstructed image based on the scaled image and a modified scaling kernel that is generated via an optimization process, wherein the at least one visual artifact has been reduced within the second reconstructed image or eliminated.

12. The non-transitory computer-readable medium of clause 11, wherein the step of generating the first reconstructed image comprises encoding the scaling kernel into a latent space to generate a latent representation of the scaling kernel, generating a degradation map based on the latent representation of the scaling kernel, and combining the scaled image and the degradation map to generate the first reconstructed image.

13. The non-transitory computer-readable medium of any of clauses 11-12, wherein encoding the scaling kernel into the latent space comprises compressing the scaling kernel to generate a compressed version of the scaling kernel that has a lower dimensionality than the scaling kernel.

14. The non-transitory computer-readable medium of any of clauses 11-13, wherein generating the degradation map comprises copying the latent representation of the scaling kernel across one or more regions associated with a target image having the first resolution.

15. The non-transitory computer-readable medium of any of clauses 11-14, wherein combining the scaled image and the degradation map comprises classifying at least a portion of the scaled image and the degradation map using a convolutional neural network to generate the first reconstructed image.

16. The non-transitory computer-readable medium of any of clauses 11-15, wherein the step of generating the image difference comprises obtaining a set of outputs derived from a convolutional layer of a first convolutional neural network that is used to generate the first reconstructed image, and combining the scaled image and the degradation map with the set of outputs to generate the image difference, wherein the image difference represents a difference between the first reconstructed image and an initial version of the scaled image.

17. The non-transitory computer-readable medium of any of clauses 11-16, wherein combining the scaled image and the degradation map with the set of outputs comprises classifying at least a portion of the scaled image and the degradation map using a second convolutional neural network to generate the image difference.

18. The non-transitory computer-readable medium of any of clauses 11-17, further comprising generating the downscaled image based on the scaling kernel and an initial version of the scaled image, and training one or more neural networks to generate the first reconstructed image and the image difference using training data that includes the scaled image, the scaling kernel, and the initial version of the first reconstructed image.

19. The non-transitory computer-readable medium of any of clauses 11-18, wherein the first resolution is greater than the second resolution, and the scaling kernel comprises a downscaling kernel.

20. Some embodiments include a system, comprising a memory storing a software application, and a processor that, when executing the software application, is configure to perform the steps of generating a first reconstructed image based on a scaled image and a scaling kernel, wherein the first reconstructed image has a first resolution, and the scaled image has a second resolution, generating an image difference based on the scaled image and the scaling kernel, wherein the image difference indicates that at least one visual artifact resides within the first reconstructed image, modifying the scaling kernel to produce a modified scaling kernel, and generating a second reconstructed image based on the scaled image and the modified scaling kernel, wherein the at least one visual artifact has been reduced within the second reconstructed image or eliminated.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for scaling image content, the method comprising:
    generating a first reconstructed image based on a scaled image and a scaling kernel, wherein the first reconstructed image has a first resolution, and the scaled image has a second resolution;
    generating an image difference based on the scaled image and the scaling kernel, wherein the image difference specifies at least one visual artifact that resides within the first reconstructed image;
    modifying the scaling kernel to produce a modified scaling kernel; and
    generating a second reconstructed image based on the scaled image and the modified scaling kernel, wherein the at least one visual artifact has been reduced within the second reconstructed image or eliminated in the second reconstructed image.

2. The computer-implemented method of claim 1, wherein generating the first reconstructed image comprises:
    encoding the scaling kernel into a latent space to generate a latent representation of the scaling kernel;
    generating a degradation map based on the latent representation of the scaling kernel; and
    combining the scaled image and the degradation map to generate the first reconstructed image.

3. The computer-implemented method of claim 2, wherein encoding the scaling kernel into the latent space comprises reducing a dimensionality value associated with the scaling kernel.

4. The computer-implemented method of claim 2, wherein generating the degradation map comprises copying the latent representation of the scaling kernel across one or more regions associated with a target image having the first resolution.

5. The computer-implemented method of claim 2, wherein combining the scaled image and the degradation map comprises classifying at least a portion of the scaled image and the degradation map using a convolutional neural network to generate the first reconstructed image.

6. The computer-implemented method of claim 2, wherein generating the image difference comprises:
    obtaining a set of outputs derived from a convolutional layer of a first convolutional neural network that is used to generate the first reconstructed image; and
    combining the scaled image and the degradation map with the set of outputs to generate the image difference, wherein the image difference represents a difference between the first reconstructed image and an initial version of the scaled image.

7. The computer-implemented method of claim 6, wherein combining the scaled image and the degradation map with the set of outputs comprises classifying at least a portion of the scaled image and the degradation map using a second convolutional neural network to generate the image difference.

8. The computer-implemented method of claim 1, wherein modifying the scaling kernel comprises performing a parameter optimization operation with at least one of the scaling kernel or an encoded version of the scaling kernel.

9. The computer-implemented method of claim 1, further comprising sampling a kernel space that includes a plurality of different kernels to generate the scaling kernel.

10. The computer-implemented method of claim 1, further comprising generating the scaled image based on the scaling kernel and an initial version of the scaled image.

11. A non-transitory computer-readable medium storing program instructions that, when executed by a processor, cause the processor to scale image content by performing the steps of:
generating a first reconstructed image based on a scaled image and a scaling kernel, wherein the first reconstructed image has a first resolution, and the scaled image has a second resolution;
generating an image difference based on the scaled image and the scaling kernel, wherein the image difference specifies at least one visual artifact that resides within the first reconstructed image; and
generating a second reconstructed image based on the scaled image and a modified scaling kernel that is generated via an optimization process, wherein the at least one visual artifact has been reduced within the second reconstructed image or eliminated in the second reconstructed image.

12. The non-transitory computer-readable medium of claim 11, wherein the step of generating the first reconstructed image comprises:
encoding the scaling kernel into a latent space to generate a latent representation of the scaling kernel;
generating a degradation map based on the latent representation of the scaling kernel; and
combining the scaled image and the degradation map to generate the first reconstructed image.

13. The non-transitory computer-readable medium of claim 12, wherein encoding the scaling kernel into the latent space comprises compressing the scaling kernel to generate a compressed version of the scaling kernel that has a lower dimensionality than the scaling kernel.

14. The non-transitory computer-readable medium of claim 12, wherein generating the degradation map comprises copying the latent representation of the scaling kernel across one or more regions associated with a target image having the first resolution.

15. The non-transitory computer-readable medium of claim 12, wherein combining the scaled image and the degradation map comprises classifying at least a portion of the scaled image and the degradation map using a convolutional neural network to generate the first reconstructed image.

16. The non-transitory computer-readable medium of claim 12, wherein the step of generating the image difference comprises:
obtaining a set of outputs derived from a convolutional layer of a first convolutional neural network that is used to generate the first reconstructed image; and
combining the scaled image and the degradation map with the set of outputs to generate the image difference, wherein the image difference represents a difference between the first reconstructed image and an initial version of the scaled image.

17. The non-transitory computer-readable medium of claim 16, wherein combining the scaled image and the degradation map with the set of outputs comprises classifying at least a portion of the scaled image and the degradation map using a second convolutional neural network to generate the image difference.

18. The non-transitory computer-readable medium of claim 11, further comprising:
generating the scaled image based on the scaling kernel and an initial version of the scaled image; and
training one or more neural networks to generate the first reconstructed image and the image difference using training data that includes the scaled image, the scaling kernel, and an initial version of the first reconstructed image.

19. The non-transitory computer-readable medium of claim 11, wherein the first resolution is greater than the second resolution, and the scaling kernel comprises a downscaling kernel.

20. A system, comprising:
a memory storing a software application; and
a processor that, when executing the software application, is configured to perform the steps of:
generating a first reconstructed image based on a scaled image and a scaling kernel, wherein the first reconstructed image has a first resolution, and the scaled image has a second resolution,
generating an image difference based on the scaled image and the scaling kernel, wherein the image difference specifies at least one visual artifact that resides within the first reconstructed image,
modifying the scaling kernel to produce a modified scaling kernel, and
generating a second reconstructed image based on the scaled image and the modified scaling kernel, wherein the at least one visual artifact has been reduced within the second reconstructed image or eliminated in the second reconstructed image.

* * * * *